United States Patent [19]

Gant et al.

[11] Patent Number: 4,857,234

[45] Date of Patent: Aug. 15, 1989

[54] METHOD FOR MAKING A PARTITIONING RADIOACTIVE TRACER

[75] Inventor: Preston L. Gant, Ponca City, Okla.; Kang Yang, Deceased late of Ponca City, OK. By Kumsu Yung, Executrix Ponca City, OK.

[73] Assignee: Conoco Inc., Ponca City, Okla.

[21] Appl. No.: 176,074

[22] Filed: Mar. 31, 1988

[51] Int. Cl.$^4$ .................. C09K 11/00; C09K 11/04; G21G 4/00; G01V 5/00
[52] U.S. Cl. ................... 252/645; 250/259; 250/260; 250/302; 250/303; 252/625; 252/644
[58] Field of Search ............... 252/625, 644, 645; 250/259, 260, 302, 303; 423/462, 491; 436/504; 424/1.1

[56] References Cited

U.S. PATENT DOCUMENTS

| | | | |
|---|---|---|---|
| 2,659,046 | 11/1953 | Arps | 252/645 |
| 2,691,109 | 10/1954 | Bernard | 252/645 |
| 3,954,655 | 5/1976 | Case et al. | 252/644 |
| 4,071,756 | 1/1978 | Casad | 250/260 |
| 4,448,764 | 5/1984 | Smith et al. | 424/1.1 |
| 4,656,280 | 4/1987 | Garlick | 252/645 |

OTHER PUBLICATIONS

CA93: 113945a (1980)—Khusid, A. Kh; Lyubich, M. S.; Larina, S. M. "Ethylene Iodohydrin".
CA94: 102763j (1981)—Khusid, A. Kh; Lyubich, M. S.—"Synthesis of Ethyleneiodohydrin Under Two-Phase-Catalysis Conditions".

*Primary Examiner*—Howard J. Locker

[57] ABSTRACT

A partitioning radioactive tracer material is prepared by reacting an alkali-metal salt of radioactive iodine with chloroethanol in the presence of activated carbon.

5 Claims, No Drawings

METHOD FOR MAKING A PARTITIONING RADIOACTIVE TRACER

BACKGROUND OF THE INVENTION

1. Field of the Invention

This invention relates to oil reservoir studies, and more particularly to a method of preparing a radioactive tracer material capable of partitioning between oil and water phases in a reservoir which is being studied.

The determination of the amount of oil in place in subterranean reservoirs has been a subject of great interest to the oil industry for many years. Such information is obviously of considerable interest in the case of a newly discovered reservoir which is to be produced, and is of even greater interest in a reservoir which has been subjected to primary production and possibly secondary production. In recent years the interest in tertiary oil recovery methods for recovering additional quantities of oil from reservoirs which have been subjected to primary and secondary production has increased. Since such tertiary oil recovery methods are quite expensive, it is important that a method be available for determining the amount of residual oil in a formation to be subjected to tertiary recovery prior to the initiation of the tertiary recovery operation. The residual oil present in reservoirs which have been subjected to primary or secondary recovery is oil which remains in place after waterflooding operations or the like. Such residual oil resists recovery by conventional methods, as it is trapped in the formation pores or otherwise retained in the formation by various mechanisms.

As a result of the increasing interest in the recovery of additional quantities of oil from oil reservoirs which have been subjected to secondary recovery operations, the oil industry has directed a continuing effort to the development of improved methods for determining the amount of residual oil in formations which have been subjected to secondary recovery.

2. Prior Art

There has been a great deal of work involving the use of radioactive tracers as reservoir evaluation tools. One procedure for determining the residual oil saturation of a previously waterflooded oil reservoir is described in U.S. Pat. No. 4,071,756. In that patent, a separate injection of a first water soluble tracer and a second radioactive tracer soluble in both oil and water is described. A series of gamma ray logs is carried out and the logging results are then interpreted to obtain an indication of the residual oil saturation in the reservoir. Several examples of tracer materials soluble in both oil and water are described in U.S. Pat. No. 4,071,756.

Method for preparing ethylene iodohydrin are described in CA93: 113945a (1980) and CA94: 102763j (1981).

SUMMARY OF THE INVENTION

According to the present invention, a partitioning radioactive tracer material is prepared by reacting an alkali-metal salt of radioactive iodine with chloroethanol in the presence of activated carbon. The resulting reaction goes essentially to completion to yield a radioactive iodoethanol which partitions between the oil and water phases of a reservoir to be studied.

It is thus an object of the invention to produce a partitioning radioactive tracer material.

DESCRIPTION OF THE PREFERRED EMBODIMENT

Iodoethanol has been found to partition between crude oil and reservoir brine at a ratio which is useful in carrying out residual oil studies in watered out reservoirs. The exact partition coefficient varies with temperature, brine composition, and crude oil composition, but can be readily determined for a given set of conditions. For example, for a typical crude oil and brine composition, 44 percent of added iodoethanol dissolves in the crude oil at 35° C. Thus, iodoethanol is an attractive compound for residual oil studies.

Radioactive iodoethanol can be prepared by exchanging labeled sodium iodide with non-labeled iodoethanol, but it was found that this reaction does not go to completion at useful conditions, such that labeled sodium iodide remains in the reaction mix. This reaction mix would not be suitable for a tracer study since the labeled sodium iodide would act as a water tracer, rather than as a partitioning tracer.

It was found that the reaction of labeled alkali-metal iodide with chloroethanol goes essentially to completion at reasonable conditions provided that the reaction is substantially anhydrous and that is takes place in the presence of activated charcoal. The reaction product, essentially free of radioactive alkali-metal iodide, is useful as a partitioning tracer material without the need for separation or clean-up of the reaction product mix other than a simple filtration of product mix from the activated charcoal.

The labeled alkali-metal iodide is preferably I-131 labeled sodium iodide, due to its energetic gamma radiation (allowing measurement through well casings) and its useful half-life period.

In order to minimize the amount of radioactive material that must be handled, it is desirable to be able to prepare the tracer at the well site. However, this is only practical if elaborate preparation procedures are not necessary.

It was found that labeled sodium iodide and chloroethanol could be reacted substantially to completion in a relatively short time by carrying out the reaction in the presence of activated carbon. The reaction product could then be injected directly into the well without further processing, or with no processing beyond separation of the solid activated carbon.

The preferred procedure for preparing a tracer in accordance with the invention involves dispersing a labeled sodium iodide solution onto activated charcoal by methanol wash, evaporating the activated charcoal to dryness, and then adding chloroethanol to the charcoal-sodium iodide. The combined materials are then reacted, preferably with stirring and heating, until substantially all the labeled iodide is in the form of iodoethanol. A large excess of chloroethanol is always present, so that the exchange reaction goes essentially to completion in a short time, such as two hours or less. The reaction product is then ready without further treatment for use as a partitioning tracer.

The following example illustrates the advantages of using chloroethanol over iodoethanol as a starting material.

EXAMPLE I

Using the procedure described above, 20 microcuries of sodium iodide (I-125) was reacted separately with 30 grams of chloroethanol and with 30 grams of iodoethanol. After four hours of reaction at 100° C. with stirring and refluxing, the reaction product was sampled and the radiation of the liquid sample was measured. The liquid samples were then vacuum distilled to remove haloethanol overhead, and the radiation of the recovered distilled haloethanol samples were measured. The results, tabulated below in Table 1, show that the distilled sample from the chloroethanol starting material had virtually the same radiation level as before the distillation, while the distilled sample from the iodoethanol starting material had only about one fourth of the level before distillation. Thus, the reaction of sodium iodide with iodoethanol did not go to completion as did the reaction with chloroethanol. If the reaction does not go to completion, the reaction product would have to be subjected to elaborate separation steps prior to use as a partitioning tracer, as otherwise the unreacted sodium iodide would act as a water-soluble tracer and would create calculation errors in the reservoir studies. Further, the higher conversion lowers the amount of radioactive material that must be handled, and lowers the cost of the operation.

TABLE 1

| | D/MIN/GRAM* | | |
| --- | --- | --- | --- |
| | Reaction Mixture | Distilled Reaction Mixture | Ratio |
| Chloroethanol | 271900 | 269900 | 1.007 |

TABLE 1-continued

| | D/MIN/GRAM* | | |
| --- | --- | --- | --- |
| | Reaction Mixture | Distilled Reaction Mixture | Ratio |
| Iodoethanol | 230600 | 56580 | 4.076 |

*Disintegrations/Minute/Gram

The reaction does not proceed at a practical rate without the activated carbon, but with activated carbon present the reaction proceeds at a rate sufficient for field preparation of the tracer. The activated carbon is most effective in the absence of water, so a substantially anhydrous reaction mix is much preferred.

We claim:

1. A method of preparing a radioactive iodoethanol tracer material comprising:
    (a) combining chloroethanol and an alkali-metal salt of radioactive iodine;
    (b) reacting the combined materials in the presence of activated carbon for a time sufficient to exchange substantially all the iodine in the salt with chlorine in the chloroethanol; and
    (c) recovering a reaction product containing radioactive iodoethanol produced by the reaction.
2. The method of claim 1 wherein said reaction is carried out at about 100° C.
3. The method of claim 2 wherein said radioactive iodine is iodine 131.
4. The method of claim 2 wherein said reaction is substantially anhydrous.
5. The method of claim 4 where said alkali-metal salt is sodium iodide, said sodium iodide is dispersed onto said activated carbon by a methanol wash, and said activated carbon with dispersed sodium iodide is evaporated to dryness prior to combining said chloroethanol with said sodium iodide.

* * * * *